United States Patent [19]

Wudl: Fred et al.

[11] Patent Number: 4,795,242

[45] Date of Patent: * Jan. 3, 1989

[54] CONDUCTING SUBSTITUTED POLYISOTHIANAPHTHENES

[75] Inventors: Wudl: Fred; Alan Heeger, both of Santa Barbara; Yoshiaki Ikenoue, Goleta, all of Calif.; Masao Kobayashi, Kanagawa, Japan

[73] Assignee: University of California, Alameda, Calif.

[*] Notice: The portion of the term of this patent subsequent to Feb. 3, 2004 has been disclaimed.

[21] Appl. No.: 944,138

[22] Filed: Dec. 18, 1986

Related U.S. Application Data

[63] Continuation-in-part of Ser. No. 736,984, May 22, 1985, Pat. No. 4,640,748, which is a continuation-in-part of Ser. No. 634,805, Jul. 26, 1984, abandoned.

[51] Int. Cl.$^4$ .......................... G02F 1/01; C25C 1/00
[52] U.S. Cl. .............................. 350/357; 204/59 R; 204/72; 528/377; 528/405; 549/43; 549/58
[58] Field of Search ................. 204/59 R, 72; 549/58, 549/43; 528/377, 405; 350/357

[56] References Cited

U.S. PATENT DOCUMENTS

| | | | |
|---|---|---|---|
| 2,552,796 | 5/1951 | Koft, Jr. | 260/42 |
| 2,658,902 | 11/1983 | Johnson | 260/329 |
| 3,524,835 | 8/1970 | Edmonds, Jr. | 260/79.1 |
| 3,574,072 | 4/1971 | Louvar | 204/72 |
| 3,585,163 | 6/1971 | Neale et al. | 260/47 |
| 3,615,384 | 10/1971 | Gipstein et al. | 96/1 R |
| 3,725,362 | 4/1973 | Walker | 260/79 |
| 3,775,368 | 11/1973 | Leslie et al. | 260/49 |
| 4,111,857 | 9/1978 | Engler et al. | 528/226 |
| 4,461,691 | 7/1984 | Frank | 204/242 |
| 4,640,748 | 2/1987 | Wudl et al. | 204/72 |
| 4,749,260 | 6/1988 | Yang et al. | 350/357 |

FOREIGN PATENT DOCUMENTS

| | | |
|---|---|---|
| 10164974 | 12/1985 | European Pat. Off. |
| 16117581 | 7/1984 | Japan . |
| 11417763 | 12/1987 | Japan . |
| 1159089 | 7/1966 | United Kingdom . |
| 1046209 | 10/1966 | United Kingdom . |

OTHER PUBLICATIONS

Diaz, A. F. and J. A. Logan, *J. Electroanal. Chem.* 111:111–114 (1980).
Druy, M. A. and R. J. Seymour, *Journal de Physique* C3(6):595–598(1983).
Genies, E. M. and G. Bidan, *J. Electroanal. Chem.* 149:101–113 (1983).
Inganas, O. and I. Lundstrom, *J. Electrochem. Soc.* 131(5):1129–1132 (1984).
Kaneto, K. et al., *Japanese J. Appl. Phys.* 22:L412–414 (1983).
Kobayashi, T. et al., *J. Electroanal. Chem.* 161:419–423 (1984).
Ohsawa, T. et al., *Japanese J. Appl. Phys.* 23(9):L663–665 (1984).
Yoneyama, H. et al., *J. Electrochem. Soc.* 132(10): 2414–2417 (1985).
Yoshino, K. et al., *Synthetic Metals* 10:319–326 (1985).

*Primary Examiner*—John F. Niebling
*Assistant Examiner*—Steven P. Marquis
*Attorney, Agent, or Firm*—Ciotti & Murashige

[57] ABSTRACT

Polyisothianaphthene substituted in the 5 and/or 6 positions so as to have an oxygen atom adjacent to $C_5$ or $C_6$. Substituents include alkoxys, hydroxys and dioxyalkylenes. The polymers are conducting and useful in electrochromic displays and as electrode materials.

39 Claims, 5 Drawing Sheets

CONDUCTING SUBSTITUTED POLYISOTHIANAPHTHENES

CROSS-REFERENCE TO RELATED APPLICATIONS

This is a continuation-in-part of U.S. application Ser. No. 736,984, filed May 22, 1985, which issued as U.S. Pat. No. 4,640,748 on Feb. 3, 1987 and is a continuation-in-part of U.S. application Ser. No. 634,805, filed July 26, 1984 and now abandoned.

TECHNICAL FIELD

This invention relates generally to conducting polymers and their use as electrodes in various devices, and in particular relates to certain substituted polyisothianaphthenes (PITN) and their use in electrochromic displays, batteries, solar cells, and the like.

BACKGROUND

With the latest developments in lightening, thinning and miniaturization of electric and electronic instruments, the development of new conducting materials per se has been desired.

Various sulfur-containing heterocyclic polymers are known including polymers from thiophene, U.S. Pat. No. 2,552,796 and U.S. Pat. No. 2,658,902; polymers from dibenzothiophene, U.S. Pat. No. 3,585,163; polymers from vinyl bithiophene, U.S. Pat. No. 3,615,384; polymers from various substituted thiophenes, U.S. Pat. No. 3,725,362; polymers from 2-bromo-8-hydroxy-5,5-dioxodibenzothiophene, U.S. Pat. No. 3,775,368; and polymers from tetrathiapentalene, U.S. Pat. No. 4,111,857.

Within the rapidly expanding field of polymeric conductors ("Proceedings of the International Conference on the Physics and Chemistry of Polymeric Conductors", *J. Physique, Colloque.*, (1983), C-3), the poly(heterocycles) have received attention because they are easily prepared in film form and are considerably more stable to atmospheric exposure than polyacetylene or polyphenylene. For use in stabilizing a semiconductor surface, see R. Noufi et al., *J. Amer. Chem. Soc.*, (1981), Vol. 183, 184 and references therein. A further extension of this work is our recent entry into the study of polythiophene.

Extensive investigations on new conductive polymers have been conducted. For example, polyacetylenes are under investigation for possible availability as electrode materials in secondary batteries since they show conductivities as high as $10^2$ to $10^3$ S/cm when doped with iodine or arsenic pentafluoride (cf. *Synthetic Metals*, Vol. 1, No. 2, 101 (1979/1980)). These polymers also display excellent charge-discharge characteristics. Use of polyacetylenes in solar batteries is also under investigation because of the polymers' light absorption characteristics which are close to those of sunlight. However, the polyacetylenes are disadvantageous in that they are per se susceptible to oxidation and doped polyacetylenes are extremely sensitive to humidity.

Polythiophenes have been studied not only as conductive materials and as battery electrode materials, but also as electrochromic materials making use of color changes in a doped state. For example, A. M. Druy, et al reported that 2,2'-bithienyl may be electrochemically polymerized to form a polymer having a color which reversibly varies from blue in an oxidized state to red in a reduced state, thus a potentially useful electrochromic material [cf. *Journal de Physique*, Vol. 44, No. 6, C3-595 (1983)]. However, polythiophenes, like polyacetylenes, are generally sensitive compounds.

In light of the above-described problems, the present inventors have conducted extensive investigations into conductive polymers and uses thereof, and, as a result, have found that a polymer having an isothianaphthene structure is a very stable compound which is capable of continuously and reversibly varying its color in the course of oxidation or reduction. Unsubstituted polyisothianaphthene is described in certain publications by the present inventors. See, e.g., Wudl et al., *J. Org. Chem.*, (1984), Vol. 49, pp. 3382-3384; Wudl et al., *Polymer Preprints*, Vol. 25(2), pp. 257-259; *Chemical Abstracts*, (1984), Vol. 101, part 24, p. 7, 211832q. PITN-type polymers are described in U.S. Application Ser. No. 736,984 filed 22 May 1985, the disclosure of which is hereby incorporated by reference in its entirety. See also EPO Pub. No. 164,974 (18 Dec. 1985).

Because polyisothianaphthenes are very stable and exhibit extremely rapid p-type electrochemical doping characteristics with an associated high contrast color change, many applications of the polymers are clearly feasible. One application—use in electrochromic displays—is made possible by virtue of the fact that polyisothianaphthene is a transparent, as well as conductive, polymer. After doping, a thin film of PITN has a very low optical density in the visible portion of the spectrum. Other applications which make use of the opto-electrochemical properties of PITN includes use as an electrode in a battery or electrochemical cell, a solar energy conversion device, and its general application as (or in) electrochromic material. A limitation, however, is that at very high dopant levels PITN can be attacked by the atmosphere with concomitant dedoping. A need exists, therefore, for a PITN-type polymer that retains the advantages of PITN, but is resistant to atmospheric attack at high dopant levels.

Electrochromic displays represent an improvement over liquid crystal devices, which have recently been developed as "low-energy" display devices with, potentially, a wide range of applications. The display in liquid crystal devices is dependent on visual angle and the contrast and resolution are typically poor. No memory function is provided, nor can the display be provided over a large surface area. In order to eliminate these disadvantages, studies have been extensively conducted on low-energy electrochromic display (ECD) devices which make use of a material's electrochromic properties, i.e., electrochromic materials have light absorption characteristics which vary with application of voltage or electric current.

Electrochromic materials which can be used in ECD devices may be either inorganic or organic. Inorganic materials that are considered usable mainly include oxides of transition metals, but these are limited with respect to developable colors. Transition metal oxides also cause electrochemical elution of the membrane or deterioration of electrodes when protons are used as color-forming ions, although response speeds may be high. Organic materials used in electrochromic displays typically include viologen dyes, phthalocyanine complexes, etc. However, the viologen dyes are disadvantageous in that repeated use thereof results in precipitation of insoluble substances, and the phthalocyanine complexes have an as-yet unsolved problem with adhesiveness between a vacuum-evaporated membrane and a base plate.

Other electrochromic materials which have recently been proposed include: polyanilines as disclosed in A. F. Diaz, et al., *Journal of Electro-Analytical Chemistry*, Vol. 111, 111 (1980) or Yonemaya et al., ibid, Vol. 161, 419 (1984); polypyrroles as disclosed in A. F. Diaz et al., ibid, Vol. 101 (1983) and polythiophenes as disclosed in M. A. Druy, et al., *Journal de Physique*, Vol. 44, June, page C3-595 (1983) or Kaneto et al., *Japan Journal of Applied Physics*, Vol. 23, No. 7, page L412 (1983). However, none of these materials has been put to practical use. Preferred characteristics for electrochromic materials are rapid response time in electrochromic switching, high contrast and resolution, good color tones and the like. Furthermore, as noted above, an electrochromic material such as PITN which is capable of developing a colorless tone will greatly contribute to the applicability of the device. This is in contrast to the aforementioned heteroconjugated materials which are colored in the course of conversion from an oxidized state to a reduced state. Thus, a need also exists for improved PITN-type polymers for use in ECD devices.

SUMMARY OF THE INVENTION

Accordingly, it is a primary object of the present invention to provide a conductive polymer capable of being reversibly oxidized or reduced.

It is also an object of the present invention to provide a polyisothianaphthene-type polymer that is stable to atmospheric attack at high dopant levels.

It is another object of the invention to provide a high molecular weight, substituted polyisothianaphthene.

It is a further object of the invention to provide an electrochromic membrane material that is chemically and physically stable, provides a high contrast color change upon oxidation and reduction, and gives a rapid response time in electrochromic switching.

It is another object of the invention to use substituted polyisothianaphthene as an electrode or electrode coating material, in the production of solar batteries, and, generally, as an electrochromic material in reversible oxidation-reduction systems.

These and other objects of the present invention are achieved by one or more of the following embodiments.

In one embodiment, the present invention is directed to a polymer having a structural formula selected from the group consisting of Ia and Ib wherein:

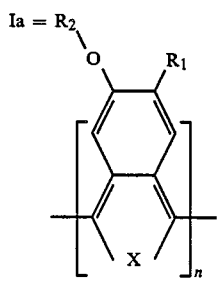

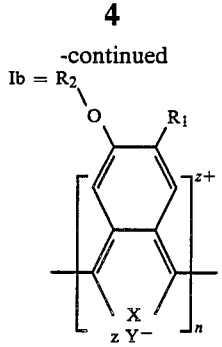

$R_1$ is hydrogen or $-OR_3$;

$R_2$ and $R_3$ are selected independently from the group consisting of hydrogen and $C_1$ to $C_8$ hydrocarbons, with the proviso that $R_2$ and $R_3$ can link together to form, with both oxygens, a dioxyalkylene substituent on the benzene ring with the formula:

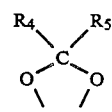

wherein $R_4$ and $R_5$ are selected independently from the group consisting of hydrogen and $C_1$ to $C_4$ hydrocarbons;

X is selected from the group consisting of sulfur, selenium and tellurium;

$Y^-$ represents an anion of an electrolyte;

z represents a number from 0.01 to 1 showing a ratio of the anion per mol of a monomer; and n represents a number of from 5 to 500 showing the degree of polymerization.

In another embodiment, the present invention is directed to a method of preparing a polymer by electrochemical polymerization comprising:

(a) providing a monomer having the formula:

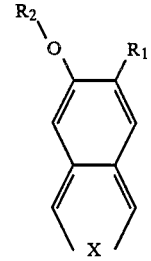

wherein $R_1$, $R_2$ and X are defined as above;

(b) dissolving said monomer in an aprotic solvent containing electrolyte to provide a monomer solution, said electrolyte being ionic and a source of nucleophilic anions; and (c) electrochemically polymerizing said monomer solution to provide a poly(isothianaphthene).

In other embodiments, the present invention is directed to ECD devices, electrodes and batteries employing the polymers described above.

DETAILED DESCRIPTION

Figure 1:
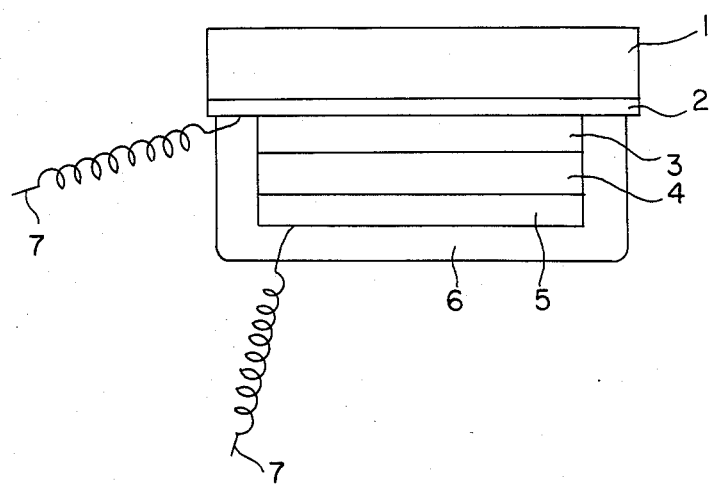
FIG. 1 is a schematic cross-sectional view illustrating an example of the ECD device in accordance with the present invention.

The conductive, substituted polyisothianaphthene-type polymers of the present invention are given by structure Ia or Ib:

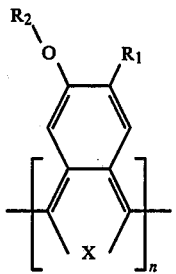

(Ia)

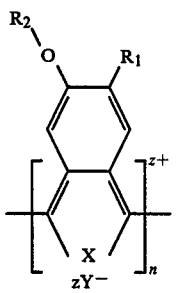

(Ib)

$R_1$ is hydrogen or $-OR_3$;

$R_2$ and $R_3$ are selected independently from the group consisting of hydrogen and $C_1$ to $C_8$ hydrocarbons, with the proviso that $R_2$ and $R_3$ can link together to form, with both oxygens, a dioxyalkylene substituent on the benzene ring with the formula:

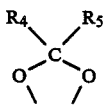

wherein $R_4$ and $R_5$ are selected independently from the group consisting of hydrogen and $C_1$ to $C_4$ hydrocarbons;

X is selected from the group consisting of sulfur, selenium and tellurium;

$Y^-$ represents an anion of an electrolyte;

z represents a number from 0.01 to 1 showing a ratio of the anion per mole of a monomer; and n represents a number of from 5 to 500, i.e. represents the degree of polymerization.

Formula Ia represents the polymer in its undoped state. Formula Ib represents the polymer in its doped, conductive state wherein a positive charge is movable along the backbone of the polymer chain. For example, in an electrochromic display device according to the present invention, application of a voltage across the polymer membrane in the device converts the neutral, uncharged polymer of Formula Ia to the charged polymer of Formula Ib.

In exemplary embodiments, X is sulfur, $R_1$ is $-OR_3$, $R_2$ and $R_3$ are either $C_1$ to $C_5$ hydrocarbons (e.g., methyl, ethyl, etc.), or the dioxyalkylene substituent where $R_4$ and $R_5$ are hydrogen, methyl or ethyl.

Referring to the undoped state of the polymer, exemplary formulas include:

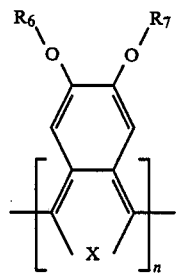

(II)

where $R_6$ and $R_7$ are selected independently from hydrogen, and $C_1$ to $C_8$ hydrocarbons; and

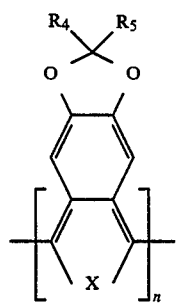

(III)

where X, $R_4$, $R_5$ and n are defined as above. The polymers of formulas II and III have doped structures equivalent to Ib. The anion of formula Ib, $Y^-$, is preferably selected from the group consisting of: $Cl^-$, $Br^-$, $I^-$, $ClO_4^-$, $BF_4^-$, $PF_6^-$, $AsF_6^-$, $SbF_6^-$, $AlCl_4^-$, $AlBr_4^-$, $FeCl_4^-$ and $CF_3SO_3^-$, but may also be $HSO_4^-$ or $HF_2^-$. The ratio z is preferably from about 0.01 to 0.40.

The small bandgap conducting polymers of the present invention are important because of their high intrinsic conductivity and because in the course of doping they are converted to transparent conductors—i.e., they change from a deeply colored form (e.g., blue-black) to transparent. When the doping is performed in an electrochemical cell, this transformation leads to high contrast electrochromism.

The substituted PITN polymers of the present invention were designed to improve the stability of the charged PITN polymer by conjugation with cation-stabilizing oxygen atoms. This stabilization is exemplified below with poly(dioxymethyleneisothianaphthene)(PDOMIT).

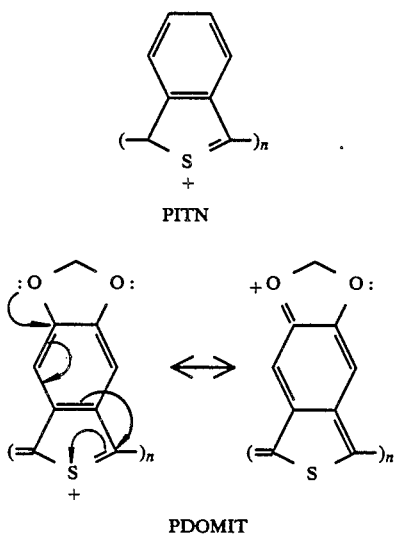

PITN

PDOMIT

As can be seen in PDOMIT, the positive charge is stabilized through resonance by a non-bonded pair of electrons on an oxygen. In addition, there exists the possibility of enhancing interchain interactions through the oxygen atoms, thus increasing the room temperature conductivity of the polymer.

The substituted PITN polymers of the present invention are prepared, for example, by the electrochemical polymerization of monomers having the structure IV:

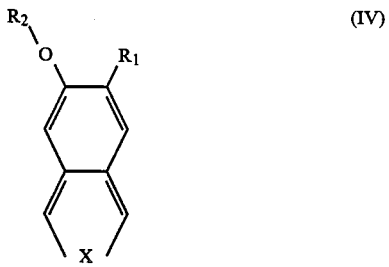

(IV)

where $R_1$, $R_2$ and X are the same as described above. Specific examples of the substituted isothianaphthenes of formula IV include 5-methoxy-isothianaphthene; 5,6-dihydroxy-isothianaphthene; 5,6-dimethoxy-isothianaphthene; 5,6-diethoxy-isothianaphthene; 5,6-dioxymethylene-isothianaphthene; and 5,6-dioxy ($\alpha,\alpha$-dimethylmethylene)-isothianaphthene. Corresponding 1,3-dihydroisothianaphthenes can also sereve as monomers, being dehydrated after polymerization as described in EPO No. 164,974.

The hydroxy and alkoxy forms of monomer IV can be prepared from the corresponding substituted 1,3-dihydroisothianaphthene, which is treated, for example, with sodium metaperiodate to provide the sulfoxide. The sulfoxide is then dehydrated to give the corresponding hydroxy or alkoxy substituted isothianaphthene.

Alternatively, monomers of formula IV are prepared from substituted 1,2-bishalomethylbenzene. An example of such compounds are 1,2-bischloromethyl-4,5-dioxymethylene benzene, and 1,2-bischloromethyl-4,5-dimethoxy benzene. These substituted halomethylbenzenes are reacted with, for example, sodium sulfide nonahydrate to give the 1,3-dihydroisothianaphthene derivative. This is then converted to the sulfoxide corresponding to formula IV, and then dehydrated to give the isothianaphthene monomer.

Hydroxy substituted polymers can also be prepared directly from PDOMIT by converting the dioxymethylene group to hydroxy groups. This is done, for example, by treating PDOMIT with HI, methylmagnesium iodide or aluminum chloride.

The monomers of formula IV are preferably electrochemically polymerized. Electrochemical polymerization of the above-described substituted isothianaphthene compound can be carried out according to the methods generally employed for electrochemical polymerization of thiophene, pyrrole, etc. (e.g., the method described in *Solid State Communication*, Vol. 46, No. 5, 389 (1983)). More specifically, either controlled potential electrolysis or controlled current electrolysis can be employed, and it is desirable to form a polymer membrane on a transparent base by using a conductive transparent base as a sample electrode. Procedural details of the preferred electrochemical polymerization process are set forth in related application U.S. Ser. No. 736,934, as are alternative synthetic methods. See also, EPO Pub. No. 164,974; commonly owned U.S. patent application Ser. No. 937,115, filed 2 Dec. 1986, entitled "Polymer Having Isothianaphthene Structure and Electrochromic Display", by Wudl, Heeger and Kobayashi, the disclosure of which is incorporated herein by reference.

In a preferred embodiment of the invention, an electrochromic display device includes an electrochromic, polymeric membrane comprising the substituted polyisothianaphthenes disclosed herein. Referring to FIG. 1, substituted polyisothianaphthene membrane 3 is formed on display electrode 2, e.g. by electropolymerization, which display electrode is in turn adjacent transparent base 1. Liquid electrolyte 4, which includes a support electrolyte dissolved or dispersed in a suitable solvent, separates the PITN membrane from opposing electrode 5. Protecting layer 6 serves as a housing for the device. Voltage is applied across the device, i.e. between display electrode 2 and opposing electrode 5, by means of lead-in wires 7 which are in electrical contact with the two electrodes.

The thickness of the PITN layer in the electrochromic display is from about 0.03 to 30 $\mu$m, preferably from about 0.05 to 22 $\mu$m, still more preferably from about 0.1 to 10 $\mu$m. When the membrane thickness is less than about 0.03 $\mu$m, clear contrast cannot be attained. A thickness exceeding about 30 $\mu$m provides clear contrast, but is disadvantageous from the point of view of film strength and response speed.

The conductive transparent base 1 which can be used in the present invention includes ones which comprise a transparent insulator such as glass, polyester film, etc., having vacuum evaporated thereon indium-tin oxide, tin oxide, platinum, etc. by sputtering or a like method. These materials are readily available commercially.

ECD devices can be produced by assembling the thus obtained polymer with an opposing electrode via a liquid electrolyte. The liquid electrolyte which can be used is a dispersion or solution of a supporting electrolyte in a solvent. The supporting electrolyte which can be used in the present invention includes combinations of (i) anions (i.e., $Y^-$ in the formula Ib) such as halide anions of Va group elements, e.g., $PF_6^-$, $SbF_6^-$, $AsF_6^-$ and $SbCl_6^-$; halide anions of IIIa Group series element, e.g., $BF_4^-$; halogen anions, e.g., $I^-(I_3^-)$, $Br^-$ and $Cl^-$; perchloric acid anions, e.g., $ClO_4^-$; and (ii) cations such as alkali metal ions, e.g., $Li^+$, $Na^+$ and $K^+$; quaternary ammonium ions, e.g., $R_4N^+$ (wherein R represents a hydrocarbon residue having 1 to 20 carbon atoms); and phosphonium ions, e.g., $(C_6H_5)_4P^+$. These examples are merely illustrative and not limiting.

Specific examples of the supporting electrolytes composed of the above-described combinations of anions and cations are $LiPF_6$, $LiSbF_6$, $LiAsF_6$, $LiClO_4$, $NaI$, $NaPF_6$, $NaSbF_6$, $NaAsF_6$, $NaClO_4$, $KI$, $KPF_6$, $KSbF_6$, $KAsF_6$, $KClO_4$, $[(n-Bu)_4N]^+ \cdot ClO_4^-$, $LiAlCl_4$, $LiBF_4$, $(C_6H_5)_4P \cdot BF_4$, $(C_6H_5)_4P \cdot AsF_6$ and $(C_6H_5)_4P \cdot ClO_4$. These examples, again, are not limiting. Supporting electrolytes may be used individually or in combination.

The $HF_2^-$ and $HSO_4^-$ anions can also be used, in addition to the above-enumerated anions. Further, cations which can be used in addition to those enumerated above include pyrylium or pyridinium ions represented by the following formula (V) and carbonium cations represented by the following formula (VI):

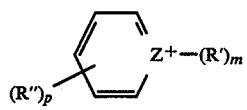
(V)

wherein Z represents an oxygen atom or a nitrogen atom; R' represents a hydrogen atom, an alkyl group having 1 to 15 carbon atoms or an aryl group having 6 to 15 carbon atoms; R" represents a halogen atom, an alkyl group having 1 to 10 carbon atoms or an aryl group having 6 to 15 carbon atoms; m is 0 when Z is an oxygen atom, or m is 1 when Z is a nitrogen atom; and p is 0 or an integer of from 1 to 5; and

(VI)

wherein $R^3$, $R^4$ and $R^5$ are independently selected from the group consisting of hydrogen atoms, alkyl groups having 1 to 15 carbon atoms, aryl groups having 6 to 15 carbon atoms and $-OR^6$ wherein $R^6$ represents an alkyl group having 1 to 10 carbon atoms or an aryl group having 6 to 15 carbon atoms, with proviso that $R^3$, $R^4$ and $R^5$ are not all hydrogen atoms.

The $HF_2^-$ anion which can be used is usually obtained by dissolving a hydrofluoride compound represented by the formula (VII), (VIII), or (IX):

$R'_4N \cdot HF_2$ (VII)
$M \cdot HF^2$ (VIII)

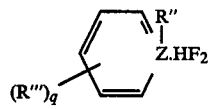
(IX)

wherein R' and R" each represents a hydrogen atom, an alkyl group having 1 to 15 carbon atoms or an aryl group having 6 to 15 carbon atoms; R" represents an alkyl group having 1 to 10 carbon atoms or an aryl group having 6 to 15 carbon atoms; Z represents an oxygen atom or a nitrogen atom; q represents 0 or a positive integer of 5 or less; and M represents an alkali metal, as a supporting electrolyte in an appropriate solvent. Specific examples of the compounds represented by the above formulae (VII), (VIII) and (IX) include $H_4N \cdot HF_2$, $Bu_4N \cdot HF_2$, $Na \cdot HF_2$, $K \cdot HF_2$, $Li \cdot HF_2$ and

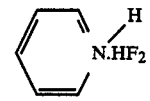

The pyrylium or pyridinium cations can be obtained by dissolving a salt formed between a cation represented by the formula (V) and an anion, e.g., $ClO_4^-$, $BF_4^-$, $AlCl_4^-$, $FeCl_4^-$, $SnCl_5^-$, $PF_6^-$, $PCl_6^-$, $PCl_6^-$, $SbF_6^-$, $AsF_6^-$, $CF_3SO_3^-$, $HF_2^-$, etc., as a supporting electrolyte in an appropriate solvent. Specific examples of such salts include:

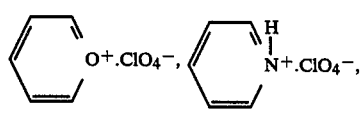

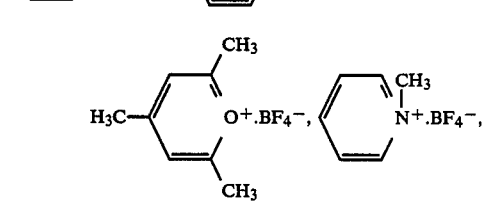

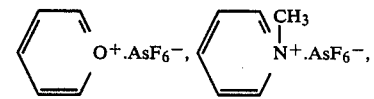

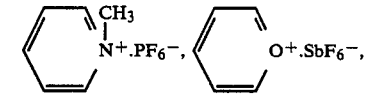

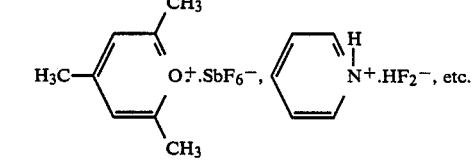

Specific examples of the carbonium cations represented by the above-described formula (VI) include $(C_6H_5)_3C^+$, etc. These carbonium atoms can be obtained by dissolving or dispersing a carbonium salt formed between such a cation and an anion as a supporting electrolyte in an appropriate solvent. Suitable anions typically include $BF_4^-$, $AlCl_4^-$, $AlBr_3Cl^-$, $FeCl_4^-$, $PF_6^-$, $PCl_6^-$, $SbCl_6^-$, $SbF_6^-$, $ClO_4^-$, $CF_3SO_3^-$, etc., and the carbonium salt specifically includes, for example, $(C_6H_5)_3C \cdot BF_4$, $(CH_3)_3C \cdot BF_4$, $HCO \cdot AlCl_4$, $HCO \cdot BF_4$, $C_6H_5CO \cdot SnCl_5$, etc.

The solvents which can be used in the present invention may be either aqueous or nonaqueous, although a solution of the aforesaid supporting electrolyte in a nonaqueous organic solvent is preferred. The organic solvents used herein are preferably aprotic and have high dielectric constants. For example, ethers, ketones, nitriles, amines, amides, sulfur compounds, phosphoric ester compounds, phosphorous ester compounds, boric ester compounds, chlorinated hydrocarbons, esters, carbonates, nitro compounds and the like can be employed. Of these, ethers, ketones, nitriles, phosphoric ester compounds, phosphorous ester compounds, boric ester compounds, chlorinated hydrocarbons and carbonates are preferred. Specific examples of suitable solvents include tetrahydrofuran, 2-methyltetrahydrofuran, 1,4-dioxane, acetonitrile, proprionitrile, 4-methyl-2-pentanone, butyronitrile, valeronitrile, benzonitrile, 1,2-dichloroethane, γ-butyrolactone, valerolactone, dimethoxyethane, methylformate, propylene carbonate, ethylene carbonate, dimethylformamide, dimethyl sulfoxide, ethyl phosphate, methyl phosphate, ethyl phosphite, methyl phosphite, 3-methylsulfolane, etc. Among these, nitriles and carbonates are especially preferred in order to increase the response speed. These organic solvents may be used alone or in combination.

Depending upon the model of ECD devices used or the kind of electrodes used, oxygen or water present in these solvents or protonic solvents sometimes deteriorate the performance of ECD devices. Such being the case, it is preferable to purify the solvents beforehand in the usual manner. Further, in the ECD devices of the present invention, organic solvents having merely dispersed therein a supporting electrolyte, or an organic solid electrolyte having high ionic conductivity which is composed of polyethylene oxide and NaI, NaSCN, etc, can also be used in addition to the above-described electrolytes.

Concentrations of the supporting electrolyte used in the ECD devices of this invention vary depending on the kind of organic solvents used, current and voltage values of applied electricity, operating temperatures, the kind of supporting electrolytes and the like and, therefore cannot generally be fixed. The liquid electrolyte may be either homogeneous or heterogenous, but usual concentrations range from about 0.001 to about 10 mol/l. The distance between the high molecular weight conductive membrane and an opposing electrode cannot generally be determined since it varies, depending on the kind of supporting electrolytes, current and voltage values of applied electricity, the display surface area as an ECD device and the like, but it is preferably from about 0.05 to about 5 mm. Further, as an opposing electrode, a variety of materials can be employed according to the end use. For example, when transmitted light is utilized for displaying, the conductive transparent materials are preferably used as opposing electrodes. If reflected light is utilized, however, it is also possible to use opaque conductive materials as opposing electrodes. Examples of opaque materials include, but are not limited to, metal foil (e.g., nickel or platinum) and gauze. Furthermore, since the ECD devices provide a substantially colorless tone, background plates having various color tones can be selected. Thus, the ECD devices of the present invention can be used in a wide variety of applications owing to the wide selection of available materials which can be used.

Other uses of the polyisothianaphthene family include general use as electrically conductive or electrochromic materials, i.e., in applications where a highly conductive polymer—displaying extremely rapid electrochemical doping characteristics—is desired, or where reversible oxidation and reduction occurs, with or without simultaneous optical switching.

In one alternative embodiment of the invention, then, the polyisothianaphthenes of the present invention are used as electrodes or as electrode coatings in a battery. For example, a battery may be provided wherein a polyisothianaphthene is the cathode and lithium, calcium or other suitable material is used as an anode. The electrodes are separated with a porous partitioning membrane selected such that ions can freely pass through its structure. The electrode/membrane assembly is then placed within a suitable electrolyte solution, and a voltage is applied across the electrodes. Such a battery may be used repeatedly without substantial reduction in the charge-discharge efficiency of the device. Furthermore, self-discharging in such a polyisothianaphthene battery is minimized.

The substituted polyisothianaphthene disclosed herein are also useful in a solar energy conversion cell, as a surface membrane material which is rendered conductive upon absorption of light. These polymers are particularly effective in a solar battery, as the polymers' light absorption characteristic are relatively close to that of sunlight. These polymers also represent an improvement over the analogous use of polyacetylenes, as those compounds are particularly susceptible to oxidation and are extremely sensitive to humidity.

The following examples are provided for illustrative purposes only and are not intended to limit the present invention in any way, the scope of which is defined in the claims.

EXAMPLE I

To solution of 1.5 g (6.85 mmol) of 1,2-bis-chloromethyl-4,5-dioxymethylene benzene [prepared according to Brit. Pat. No. 1,159,089; Ger Offen No. 1,924,747 (CA71: p80934m, CA72: p66609y)] in 1.5 L of degassed ethanol (100%) (this high dilution is necessary to avoid formation of a white, intractable polymer), was added 1.81 g (1.1 eq., 7.54 mmol) of finely ground sodium sulfide nonahydrate. The resulting reaction mixture was heated to reflux with stirring for five hours under nitrogen. Upon cooling, to the resulting cloudy solution (separation of sodium chloride) was added an aqueous solution of 1.61 g (1.1 eq., 7.54 mmol) of sodium metaperiodate in 260 mL of water. After 4 hr of reflux the resulting reaction mixture was filtered through a glass frit, the filtrate was concentrated, and extracted with chloroform three times followed by drying over anhydrous sodium sulfate. Evaporation of the filtered chloroform solution was evaporated and chromatographed on silica gel with chloroform as the eluent to afford a colorless solid (yield 21%) sulfoxide. Ms 196, ir (KBr, cm$^{-1}$) 2880m, 1475s, 1420w, 1370w, 1280s, 1200m, 1145m, 1020s, 930m, 900w, 840m, 410m, 340w; nmr (CDCl$_3$, δ rel to TMS) 4.1q 4H, 5.99s 2H, 5.77s 2H.

The above sulfoxide was ground with an excess of alumina (activity I), placed in a sublimer and heated to 110° under 0.25 pressure. The resulting dioxymethylene isothianaphthene (DOMT) sublimed onto the cold finger of the sublimer in the form of white microcrystals. This heterocycle was apparently more stable than the parent ITN. Ms 178, nmr (CDCl$_3$, δ rel to TMS) 5.88s 2H, 6.77s 2H, 7.29s 2H.

DOMIT, prepared as above, was electropolymerized in the usual way (EPO No. 164,974) in acetonitrile at room temperature using tetraphenylphosphonium chloride (0.1M) as electrolyte, ITO glass as an anode and carbon graphite as a cathode. The resulting gray film was Soxhlet extracted overnight with acetonitrile and tetrahydrofuran to afford a dedoped blue-black film.

Figure 2:
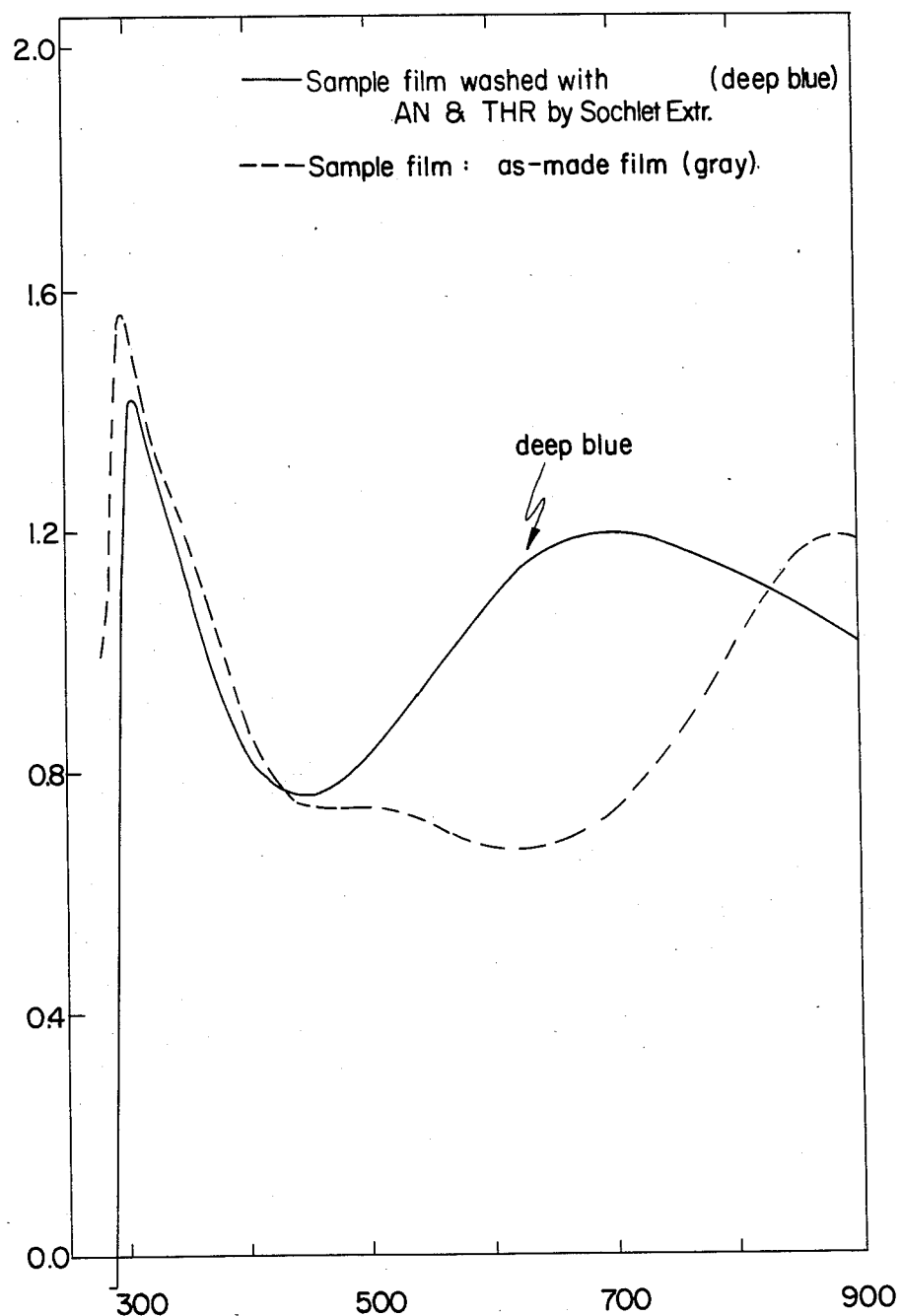
FIG. 2 shows the electronic absorption of a polymer according to the present invention both "as made" (broken line) and partially undoped by solvents used in the extraction process (solid line).

FIG. 2 shows that the electronic absorption of the undoped polymer has absorption extending into the near infrared, indicating that the interband gap is on the order of ≦1 eV. The solid line in FIG. 2 is the extracted polymer; the broken line is the film "as made".

Figure 3:
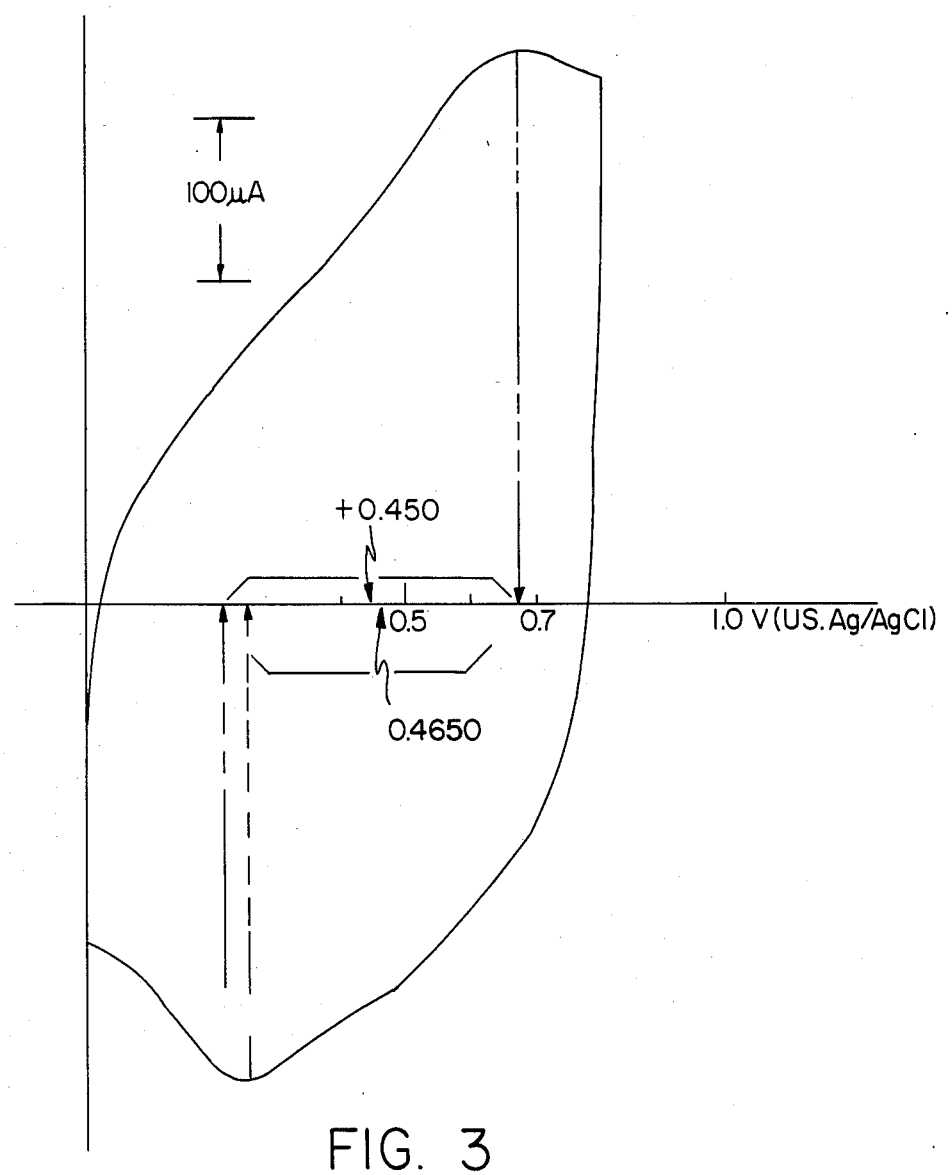
FIG. 3 shows the results for a cyclic voltammogram experiment with a polymer according to the present invention.

The film could be cycled between transparent gray and blue-black in a typical cycle voltammogram experiment (see FIG. 3). In the experiment, the grey, uniform film on ITO glass was used as the electrode, with Pt wire as the counter electrode in freshly distilled acetonitrile (0.06M-Bu4NClO4). The reference electrode was Ag/AgCl. Visual observation during electrochemical cycling indicated that PDOMIT is a higher contrast electrochromic than PITN (change from blue-black to transparent gray).

Figure 4:
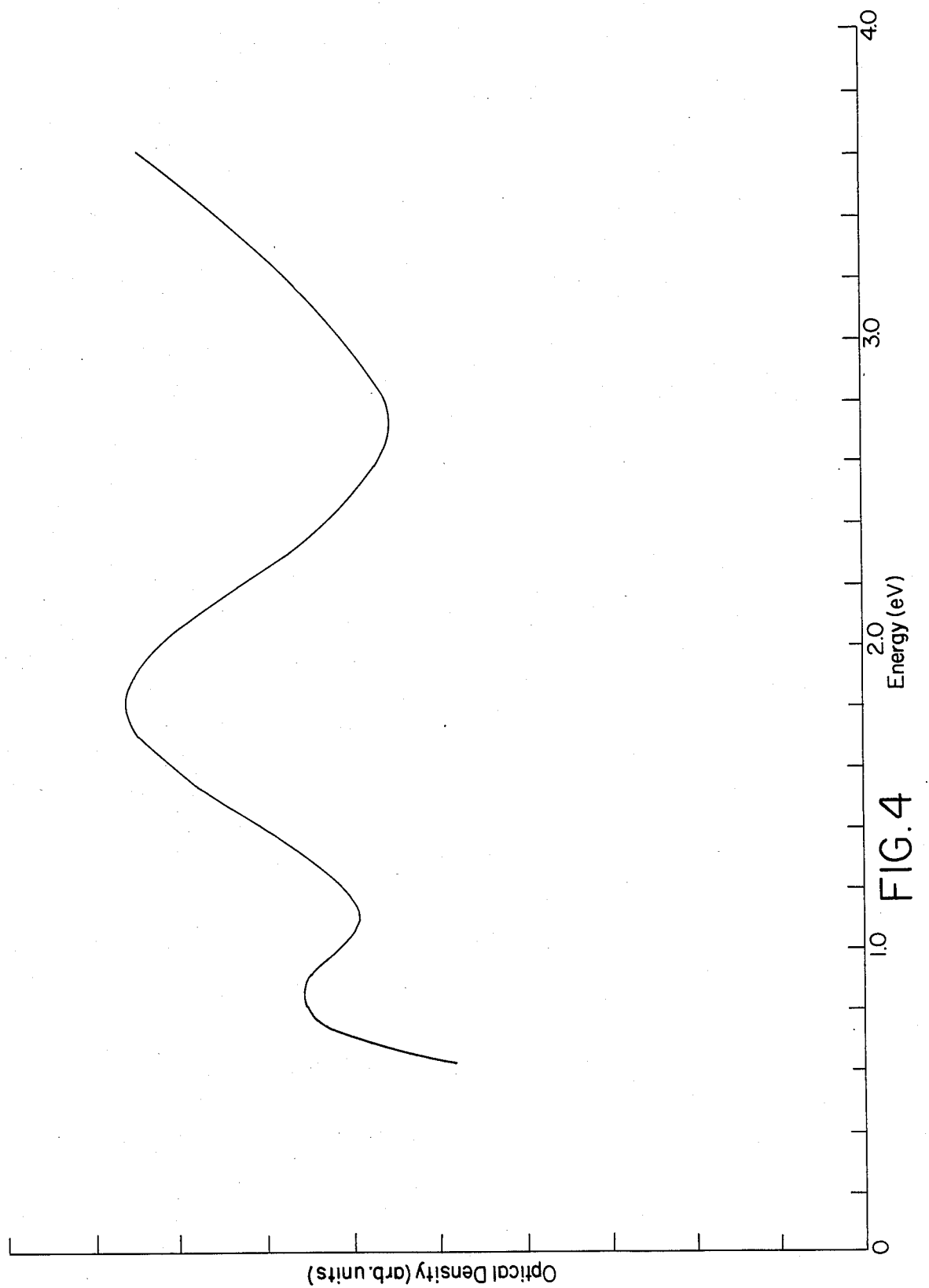
FIG. 4 is the absorption spectrum of a doped, electrochemically polymerized film according to the present invention in its "as grown" condition.
Figure 5:
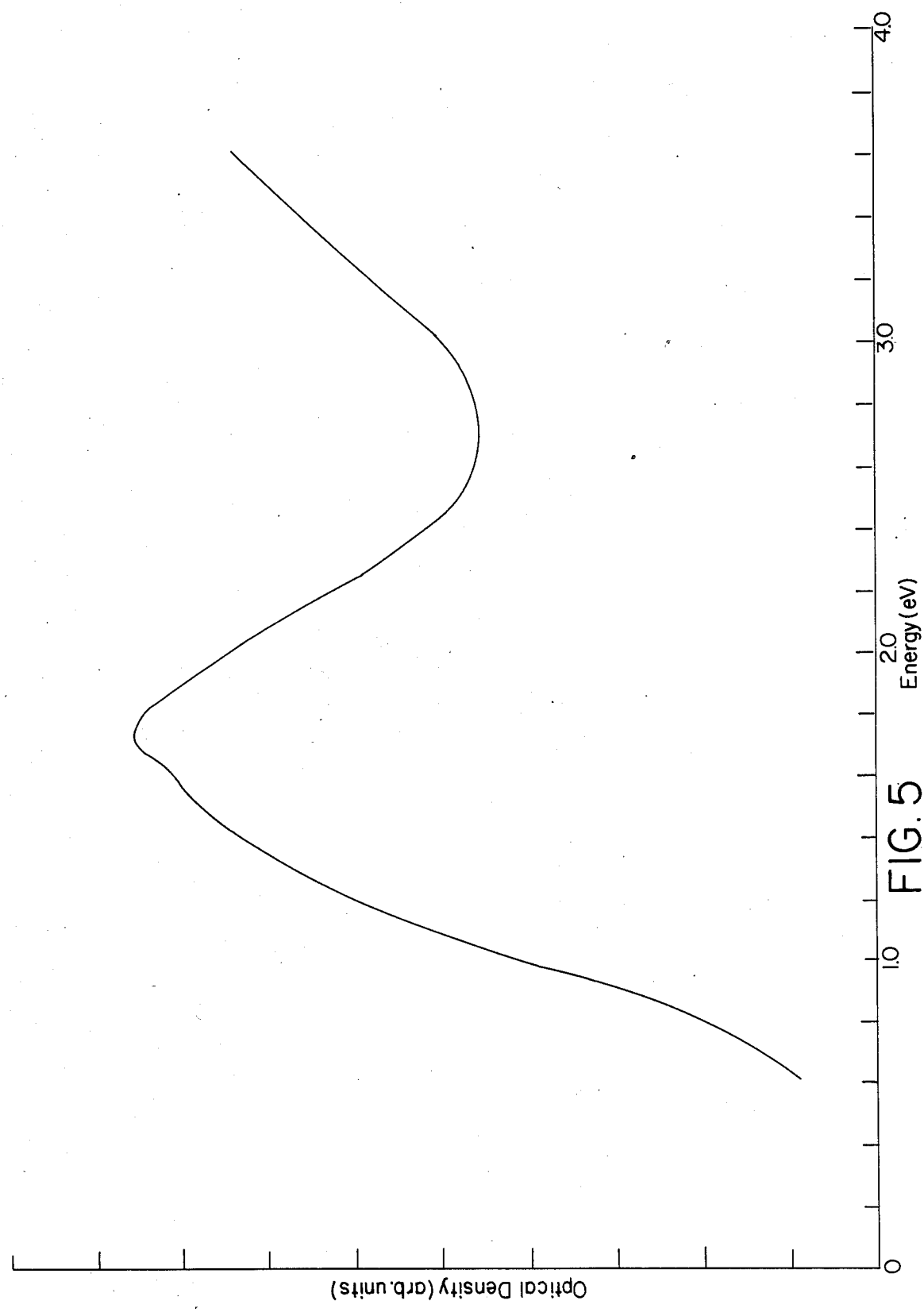
FIG. 5 is the adsorption spectrum of the same polymer film shown in FIG. 4 after compensation with hydrazine.

The absorption spectrum of PDOMIT was obtained for the as-grown film (FIG. 4) and for the same film after compensation with hydrazine (FIG. 5). The results (FIG. 4) indicate that the as-grown film is relatively heavily doped (consistent with the lower oxidation potential). After compensation, the existence of an energy gap ($E_g$) becomes clearly evident; extrapolating the absorption edge implies $E_g \approx 0.6$ eV. The as-grown PDOMIT film is stable in air.

EXAMPLE II 1,3-dihydro-5,6-dimethoxyisothianaphthene is prepared as described in *J. Chem. Soc.*, Parkin Trans. 1 (1980) 8, p. 184126. This compound is then treated with sodium metaperiodate, as described in EPO Pub. No. 164,974, to give 1,3-dihydro-5,6-dimethoxyisothianaphthene-2-oxide. The sulfoxide is then dehydrated and polymerized as described in Example I to give poly(5,6-dimethoxyisothianaphthene).

EXAMPLE III 2,2-dibromopropane is reacted with catechol to give 1,2-dioxy($\alpha,\alpha$-dimethylmethylene)benzene (DDMB) according the method disclosed in G.B. Patent Spec. No. 1,097,270. DDMB has the following structure:

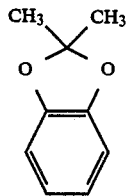

DDMB is then reacted as described in Example I to give poly(5,6-dioxy($\alpha,\alpha$-dimethylmethylene)isothianaphthene)

EXAMPLE IV 3,4-bisbromomethylanisol is prepared according to G.B. Patent Spec. No. 1,268,243. It is the converted to the corresponding isothianaphthene and polymerized, as described in Example I, to give poly(5-methoxyisothianaphthene).

While the present invention has been described by way of specific embodiments, variations will be apparent to those in the art from the foregoing description and the practice of the present invention. Thus, the present invention is not limited to the foregoing specific embodiments, but is defined by the following claims.

We claim:

1. A polymer having a structural formula selected from the group consisting of Ia and Ib wherein:

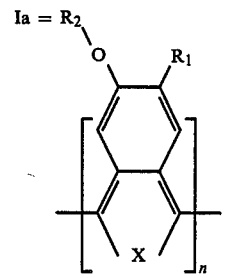

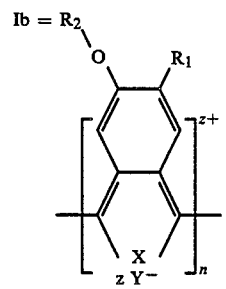

$R_1$ is hydrogen or $-OR_3$;

$R_2$ and $R_3$ are selected independently from the group consisting of hydrogen and $C_1$ to $C_8$ hydrocarbons, with the proviso that $R_2$ and $R_3$ may be linked together to form, with both oxygens, a dioxyalkylene substituent on the benzene ring with the formula:

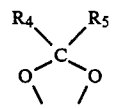

wherein $R_4$ and $R_5$ are selected independently from the group consisting of hydrogen and $C_1$ to $C_4$ hydrocarbons;

X is selected from the group consisting of sulfur, selenium and tellurium;

$Y^-$ represents an anion of an electrolyte;

z represents a number from 0.01 to 1 showing a ratio of the anion per mol of a monomer; and n represents a number of from 5 to 500 showing the degree of polymerization.

2. The polymer of claim 1 wherein $R_1$ is $-OR_3$; $R_2$ and $R_3$ are either (i) selected from the group consisting of methyl and ethyl, or (ii) together with the oxygens form said dioxyalkylene where $R_4$ and $R_5$ are selected from the group consisting of hydrogen, methyl and ethyl; and X is sulfur.

3. The polymer of claim 2 wherein $R_2$ and $R_3$ are methyl or ethyl, and $R_2 = R_3$.

4. The polymer of claim 2 wherein $R_2$ and $R_3$ are methyl.

5. The polymer of claim 2 wherein $R_2$ and $R_3$ together from said dioxyalkylene, $R_4$ and $R_5$ are hydrogen or methyl, and $R_4 = R_5$.

6. The polymer of claim 5 wherein $R_4$ and $R_5$ are hydrogen.

7. The polymer of claim 2 wherein said structural formula is Ia.

8. The polymer of claim 3 wherein said structural formula is Ia.

9. The polymer of claim 4 wherein said structural formula is Ia.

10. The polymer of claim 5 wherein said structural formula is Ia.

11. The polymer of claim 6 wherein said structural formula is Ia.

12. The polymer of claim 2 wherein said structural formula is Ib.

13. The polymer of claim 3 wherein said structural formula is Ib.

14. The polymer of claim 4 wherein said structural formula is Ib.

15. The polymer of claim 5 wherein said structural formula is Ib.

16. The polymer of claim 6 wherein said structural formula is Ib.

17. The polymer of claim 12 wherein $Y^-$ is selected from the group consisting of $Cl^-$, $Br^-$, $I^-$, $ClO_4^-$, $BF_4^-$, $PF_6^-$, $AsF_6^-$, $SbF_6^-$, $AlCl_4^-$, $AlBr_4^-$, $FeCl_4^-$, and $CF_3SO_3^-$.

18. The polymer of claim 13 wherein $Y^-$ is selected from the group consisting of $Cl^-$, $Br^-$, $I^-$, $ClO_4^-$, $BF_4^-$, $PF_6^-$, $AsF_6^-$, $SbF_6^-$, $AlCl_4^-$, $AlBr_4^-$, $FeCl_4^-$, and $CF_3SO_3^-$.

19. The polymer of claim 14 wherein $Y^-$ is selected from the group consisting of $Cl^-$, $Br^-$, $I^-$, $ClO_4^-$, $BF_4^-$, $PF_6^-$, $AsF_6^-$, $SbF_6^-$, $AlCl_4^-$, $AlBr_4^-$, $FeCl_4^-$, and $CF_3SO_3^-$.

20. The polymer of claim 15 wherein $Y^-$ is selected from the group consisting of $Cl^-$, $Br^-$, $I^-$, $ClO_4^-$, $BF_4^-$, $PF_6^-$, $AsF_6^-$, $SbF_6^-$, $AlCl_4^-$, $AlBr_4^-$, $FeCl_4^-$, and $CF_3SO_3^-$.

21. The polymer of claim 16 wherein $Y^-$ is selected from the group consisting of $Cl^-$, $Br^-$, $I^-$, $ClO_4^-$, $BF_4^-$, $PF_6^-$, $AsF_6^-$, $SbF_6^-$, $AlCl_4^-$, $AlBr_4^-$, $FeCl_4^-$, and $CF_3SO_3^-$.

22. The polymer of claim 12 wherein $Y^-$ is $HSO_4^-$.

23. The polymer of claim 13 wherein $Y^-$ is $HSO_4^-$.

24. The polymer of claim 14 wherein $Y^-$ is $HSO_4^-$.

25. The polymer of claim 15 wherein $Y^-$ is $HSO_4^-$.

26. The polymer of claim 16 wherein $Y^-$ is $HSO_4^-$.

27. A method of preparing a poly(isothianaphthene) polymer by electrochemical polymerization comprising:

(a) providing a monomer having the formula:

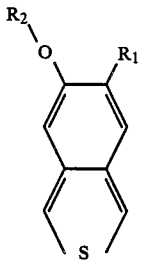

$R_1$ is hydrogen or $-OR_3$;

$R_2$ and $R_3$ are selected independently from the group consisting of hydrogen and $C_1$ to $C_8$ hydrocarbons, with the proviso that $R_2$ and $R_3$ can link together to form, with both oxygens, a dioxyalkylene substituent on the benzene ring with the formula:

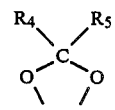

wherein $R_4$ and $R_5$ are selected independently from the group consisting of hydrogen and $C_1$ to $C_4$ hydrocarbons;

(b) dissolving said monomer in an aprotic solvent containing electrolyte to provide a monomer solution, said electrolyte being ionic and a source of nucleophilic anions; and (c) electrochemically polymerizing said monomer solution to provide a poly(isothianaphthene).

28. The method of claim 27 wherein said monomer is 5,6-dioxymethylene-isothianaphthene.

29. The method of claim 27 wherein said monomer is 5,6-dimethoxy-isothianaphthene.

30. The method of claim 27 wherein said polymerization forms said poly(isothianaphthene) into a membrane on a transparent conductive base.

31. The method of claim 28 wherein said polymerization forms said poly(isothianaphthene) into a membrane on a transparent conductive base.

32. An improved electrochromic display device comprising a display electrode, an opposing electrode, a liquid electrolyte therebetween, a housing for the display device which contains said opposing electrode and said liquid electrolyte, and a means for applying voltage across said two electrodes, wherein the improvement comprises a coating on said display electrode formed from the polymeric material of claim 1.

33. The device of claim 32, wherein the thickness of said coating of polymeric material is in the range of about 0.03 to about 30 microns.

34. The device of claim 33, wherein the thickness of said coating of polymeric material is in the range of about 0.05 to about 22 microns.

35. The device of claim 34, wherein the thickness of said coating of polymeric material is in the range of about 0.1 to about 10 microns.

36. The device of claim 32, wherein said liquid electrolyte comprises a support electrolyte dissolved or dispersed in a suitable solvent.

37. The device of claim 36, wherein the supporting electrolyte is selected from the group consisting of $LiPF_6$, $LiSbF_6$, $LiAsF_6$, $LiClO_4$, $NaI$, $NaPF_6$, $NaSbF_6$, $NaAsF_6$, $NaClO_4$, $KI$, $KPF_6$, $KSbF_6$, $KAsF_6$, $KClO_4$, $[(n-Bu)_4N]^+ \cdot ClO_4^-$, $LiAlCl_4$, $LiBF_4$, $(C_6H_5)_4P \cdot BF_4$, $(C_6H_5)_4P \cdot AsF_6$ and $(C_6H_5)_4P \cdot ClO_4$.

38. The device of claim 36, wherein said solvent is an aprotic organic solvent.

39. The device of claim 38, wherein said solvent is selected from the group consisting of tetrahydrofuran, 2-methyltetrahydrofuran, 1,4-dioxane, acetonitrile, proprionitrile, 4-methyl-2-pentanone, butyronitrile, valeronitrile, benzonitrile, 1,2-dichloroethane, γ-butyrolactone, valerolactone, dimethoxyethane, methylformate, propylene carbonate, ethylene carbonate, dimethylformamide, dimethyl sulfoxide, ethyl phosphate, methyl phosphate, ethyl phosphite, methyl phosphite and 3-methylsulfolane.

* * * * *